July 7, 1970 E. H. OLSON 3,518,755

METHOD OF FORMING ELECTRICAL COILS

Filed July 3, 1967

INVENTOR.
EMIL H. OLSON

BY V. F. Volk
HIS AGENT

United States Patent Office 3,518,755
Patented July 7, 1970

1

3,518,755

METHOD OF FORMING ELECTRICAL COILS

Emil H. Olson, North Muskegon, Mich., assignor to Anaconda Wire and Cable Company, a corporation of Delaware Filed July 3, 1967, Ser. No. 651,036
Int. Cl. H01f 7/06
U.S. Cl. 29—605 9 Claims

ABSTRACT OF THE DISCLOSURE

An electrical coil is formed by winding an enamelled strip while the enamel is still wet and tacky, the enamel being cured hard after the coil has been formed.

BACKGROUND OF THE INVENTION

In the field of electrical apparatus there has been a growing tendency to form electrical coils from strip instead of wire. This strip is most commonly copper or aluminum because of the high conductivity of these metals, but it has been known to wind iron or iron-alloy coils to take advantage of the magnetic properties of these materials. The strip is coated with insulating enamel and in many cases the magnet strip coils, as they are called, are encapsulated in a synthetic resin that will exclude moisture and other possible contaminants.

In the present known method of making magnetic strip coils the strip is coated with an insulating enamel which is dried and solidified or cured by passing it through an oven directly downstream of the coating applicator. The strip is then taken up in large storage coils which are stored, and delivered to an electrical coil forming site as needed. Electrical coils are finally formed by winding the strip from the large storage coils in the form of spiral windings to which appropriate electrical leads are affixed. To form a coil into a tight spiral, tension is applied to the strip during the coiling operation and the shape of the completed coil is retained by means of an outer binding. Frequently the electrical coil so formed is encapsulated in an insulating resin.

The known practice of making electrical coils has proven to be unsatisfactory for thin strip because of the delicacy of the product and the high electrical quality that must be maintained. In this regard it should be realized the electrical coils are in some cases formed from strip less than one one-thousandth of an inch thick and that the thickness of the insulation coating may be in the order of about a thousandth of an inch even though the requirement for dielectric strength is measured in hundreds of volts between turns of the coil. When thin magnet strip is processed in the conventional way the steps of winding and unwinding, and of shipping and storing, are apt to cause so much damage that the manufacture of very fine strip coils has not been widely adopted commercially. A further obstacle has been the difficulty of properly insulating the edges of thin strip and particularly of avoiding damage to the insulation on the edges during coiling, uncoiling, storing and shipping.

SUMMARY

I have overcome the shortcomings of known electrical strip coils by continuously covering the surface of a metallic strip with a coating of thermosetting insulating resin, by means such as, but not necessarily limited to, a roller. Without solidifying the coating I wind the strip to form a spiral coil in such manner that the coating completely wets two adjacent turns of the coil. In one embodiment of my invention I employ an insulating resin that is too viscous for roller application at room temperature and I heat the resin to reduce its viscosity prior

2 to application. For this purpose I prefer an epoxy resin, and particularly a resin with the approximate composition of:

| Liquid epoxy resin: | Parts by weight |
|---|---|
| Wt. per epoxide 180–200 | 40 |
| M.P. 127–133° C., wt. per epoxide 1600–2000 | 50 |
| Dicyandiamide | 4.5 |

heated to approximately 93° C. at application and with the coil cured at about 170° C.

In another embodiment of my invention I first form a solid resinous coating on one surface of a metallic strip, then continuously coat the other surface with a liquid resin and proceed as above. This second method is applicable to thicker or wider foil and is preferably carried out in a single continuous operation as shall be further described. For forming coils where one surface is solidified before the second surface is coated I prefer an enamel resin comprising a blend of an epoxy and a polyesteramide which is the condensation product of a polyamine and a dibasic acid.

When coils are formed in accordance with my invention electrical leads are applied during the coiling operation and any winding and unwinding steps that may cause damage are avoided. Furthermore during the coiling operation enough of the liquid resin is forced out of the edges to provide good insulation for the edge corners and to form a bond to an encapsulant that may be applied later. Only completed, firmly set, coils need be shipped and these can be fully encapsulated to prevent damage in shipping. In any event a coil with the turns firmly bonded together by insulating resin in the manner of my invention is far less easily damaged during shipment than a freely wound coil, so that it is now possible, commercially, to use strip coils in cases where only wire coils were practicable heretofore.

DESCRIPTION OF THE PREFERRED EMBODIMENT

Figure 1:
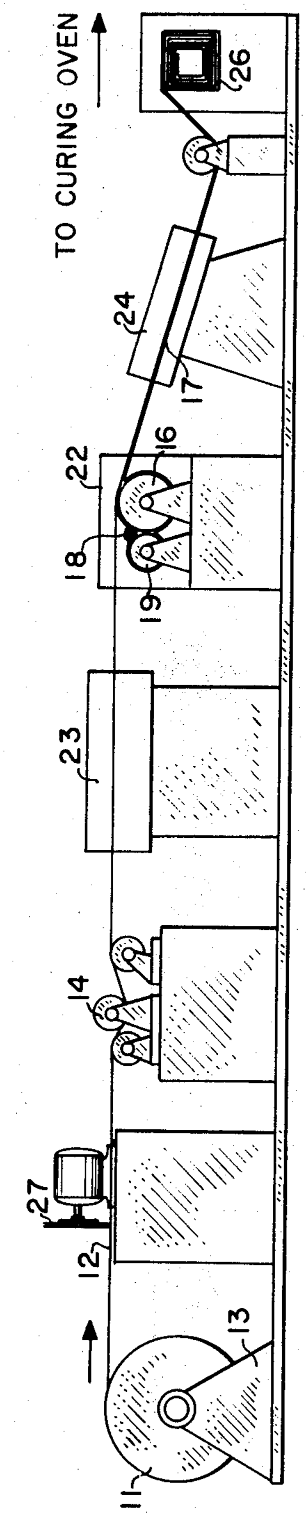
FIG. 1 shows a side view of an apparatus illustrative of a method for making electrical strip coils according to one embodiment of my invention.

Referring first to FIG. 1 a coil 11 of strip 12 is paid from a stand 13 over an edge guide roll 14 and an applicator roll 16 which applies a tacky coating 17 to the under side of the strip 12. The coating 17 is comprised initially of a liquid resin 18 of which a pool is maintained between the roll 16 and a doctor roll 19, the rolls 19 and 16 being driven by conventional means, not shown. The resin 18 must be free from tack on the rolls 16, 19 so that it will drain readily, and for this purpose a supply of the resin from which it is metered to the rolls in a known manner, is heated, and the rolls themselves are surrounded by an oven 22 to maintain the required temperature. Conditions may vary with the choice of the resin 18 but it is usually necessary that a close temperature control be maintained on the resin 18, since if the temperature drops and the viscosity rises, the applicator rolls will not function properly to apply an even coat to the strip, and if the temperature rises beyond a certain point the resin will cure prematurely.

A further means of maintaining exact temperature control resides in a pre-heat oven 23 to heat the strip 12, prior to coating. As has been stated, the temperature of the resin on the rolls 16, 19 must be left below the curing temperature, but, after the coating 17 has been applied, a cure is started by passing the coated strip through a partial curing oven 24 in which the coating 17 is not dried but is rendered very viscous and tacky. By this means it is assured that, as a coil 26 is wound, it will hold together without too much tension being applied to the strip. Enough tension is applied, however, by means, of which many types are known such as braking the payoff coil 11, to cause a slight exudation of resin between turns of the coil 26. This helps insulate the edges, which have previously been given a light brushing by rotary brushes 27, in a known manner, to remove burrs. By creating tackiness in the oven 24 the viscosity or body of the coating 17 is made sufficiently high that the turns not only adhere, but the tension in the strip is insufficient to break through the resin layer between turns and the turns are reliably separated dielectrically.

A feature of my method resides in the use of a resin 18 substantially all of the elements of which remain in the insulation of the coil 26 after curing. In other words the resin 18 comprises a 100% solids system free from any significant quantity of volatile matter that might blister during the curing of the coil. In conventional strip insulating, solvents can diffuse through the thin layers of coating as they are applied and diffuse into the oven atmosphere but in the present case, the coil 26 being formed so soon after the application of a coating would trap any solvents that were present.

I have successfully practiced by invention by formulating the resin 18 in accordance with Example 1.

EXAMPLE 1

| | Parts by weight |
|---|---|
| Epi-Rez[1] 540 | 50 |
| Epi-Rez 510 | 40 |
| Dicyandiamide | 4.5 |

[1] Epi-Rez is a trademark of Celanese Coatings Company for epoxy resins formed as condensation products of bisphenol-A and epichlorohydrin. Epi-Rez 540 has a melting point of 127–133° C., a weight per epoxide of 1600–2000 and a viscosity at 77° F. of a 40% solution in butyl carbitol of 1500–3000 centipoises. Epi-Rez 510 is a liquid at room temperature with a viscosity of 10,000–16,000 centipoises, sp. gr. of 1.15–1.17 at 25° C., and a weight per epoxide of 1800–2000.

The resin 18 when formulated in accordance with Example 1 is maintained at a temperature of about 200° F. in the oven 22, but the oven 24 is maintained at a temperature of 300–350° F. and the finished coils 26 are finally cured in an oven, not shown, at about 338° F.

Figure 3:
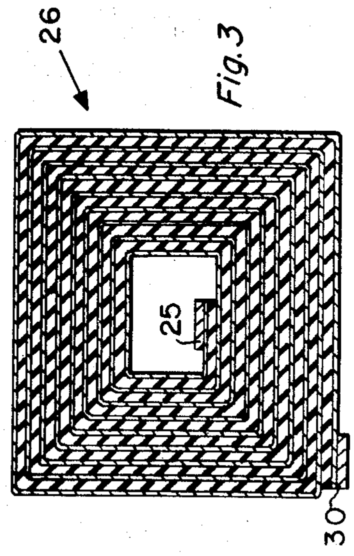
FIG. 3 shows a side section of a coil made to my invention.

It is a simple matter to apply electrical leads to the coils 26. An inside lead 25 (FIG. 3) is merely pressure welded, in a known manner, to an uncoated length of strip, and the end of the strip is permitted to pass through the apparatus without coating so that an outside lead 30 may be affixed in like manner. This can be accomplished by stopping the applicator roll 16 just before the end of the strip 12 passes through. The coils 26 may be encapsulated by hot melt dipping or by dipping in fluid powder beds of suitable resinous encapsulants in known manner.

Although I have preferred to use an epoxy enamel, other 100% solid enamels may be used in my strip coil forming method such as polyester-styrene.

Figure 2:
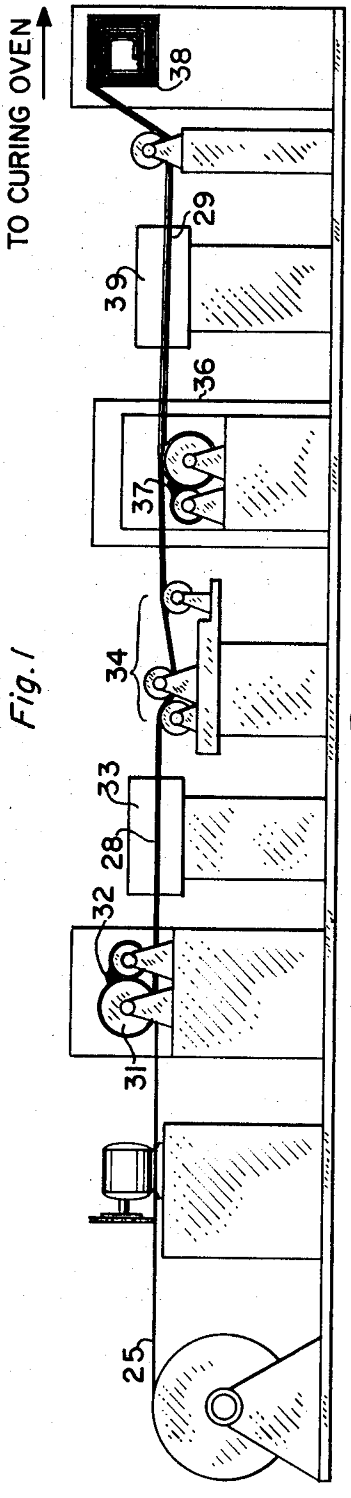
FIG. 2 shows a side view of an apparatus illustrative of a method for making electrical strip coils according to another embodiment of my invention.

In the method of FIG. 2 one surface of a strip 25 is covered with a solidified coating 28 before a liquid coating 29 is applied that is wound wet. For the practice of this method a coating may be applied to one side of a strip by conventional methods, that is by coating with an enamel dissolved in solvent, but for the full advantage of my invention to be realized the whole operation should proceed in the manner of FIG. 2. Here the upper surface of the strip is coated by means of an applicator roll 31 with an enamel 32 that is baked dry in an oven 33. When, as is preferred, the enamel 32 is 100% solids and no solvents are required to diffuse through the coating, the oven 33 may be short and free from the complicated duct work that would be required for solvent disposal. After leaving the oven 33 and edge guide rolls 34 the strip 25 is passed over an applicator roll 36 which coats the underside of the strip 25 with the coating 29 of enamel 37. As shall be more fully explained hereinbelow I have used the same composition for the enamels 32 and 37, but different enamels may be used within the scope of my invention provided that they are compatible, and provided particularly that the liquid enamel 37 will wet the coating 28 when the strip is wound into a coil 38.

The embodiment of FIG. 2 is employed for coils that are more difficult to form than the coils of FIG. 1, usually because of the use of thicker or wider strip. But it is a feature of both embodiments of my method that the coil is formed while the inner surface of the strip is wet and tacky; and to obtain a sufficient tack the strip 25 is passed through an oven 39 which is insufficient to solidify the coating in the manner of the oven 33 but will increase its body and viscosity. Although the resin of Example 1 might be used for winding a coil having a solidified insulating coating on one surface I prefer to employ the composition of Example 2 for the enamels 32 and 37.

EXAMPLE 2

| | Parts by weight |
|---|---|
| Epi-Rez 5071 | 75 |
| Versamid[1] 140 | 25 |

[1] Trademark of General Mills, Inc.

Epi-Rez 5071 designates a blend of the Epi-Rez 510 of Example 1 with butyglycidyl ether sufficient to reduce the viscosity at 77° F. to 500–900 centipoises.

Versamids refer to resins supplied by General Mills, Inc. prepared by condensing polymerized unsaturated fatty acids such as dilinoleic acid with aliphatic amines such as ethylene diamine. Versamid 140 has an amine value of 350–400 and a viscosity at 75° C. of 2–6 poises.

The resin of Example 2 is fluid enough at room temperature to be applied by means of rollers so that the oven 23 which preheats the strip 12 is omitted from FIG. 2. In using the resin of Example 2 I have made excellent electrical strip coils by advancing the strip 25 at about 20 ft./min. with the ovens 33 and 39 between 3 and 4 feet long, maintining the oven 33 at about 330° C. and the oven 39 at about 250° C. The finished coils 38 are cured overnight at room temperature or in 40 minutes at 150° C. in an oven, not shown. Since only one bare surface of the strip is necessary to apply leads by cold welding leads can be applied to the strip 25 in a manner similar to that described for the strip 12. Although I have described a preferred epoxy-polyamide resin system and a particular epoxy-amide ratio of 75–25, epoxy-amide ratios of 60–40 to 90–10 will be satisfactory for the practice of my invention and other epoxies and polyamides than those described may be used. Other suitable amides will include Versamids Nos. 100, 115 and 125. Pentamides Nos. 800, 815, 825 and 840 supplied by Ciba Chemical and Dye Company, polyamides U–15, U–25 and U–40 supplied by Shell Chemical Corporation and others.

To understand the essential features of my invention it should be realized that, when strip is wound into a coil, the metal is deformed from flat to spiral and has a natural tendency to spring open again. This is prevented, in the known art of winding coils that have been coated with solidified enamel, by maintaining considerable tension on the strip. If the same winding technique were used for winding strip coils while the enamel is still wet, too much insulation might be sequeezed out the tension. If, however, the enamel is made very tacky prior to winding, in the manner of my invention, the adhesive properties of the enamel will tend to prevent the coil from springing open so that a lesser tension can safely be applied to the strip. The increase in tack is associated, in the compositions described, by an increase in body or viscosity and this also contributes to the retention of an adequate dielectric film between the turns. The enamel cannot, however, be tacky at the time it is applied, not only because it would then tend to foul the applicator rolls, but, and even more importantly, because it would not then distribute evenly over the surface of the strip, a requirement that is essential for electrical strip coils but might not be important in other applications to which the present invention is not directed.

Of the two embodiments of our invention that have been described; in the first, associated with FIG. 1 and Example 1, I heated the resin to increase its spreadability during application, being careful not to heat it enough to initiate polymerization. In the embodiment of FIG. 2 and Example 2 I used a resin composition, for the wet undercoat, that has a low viscosity and good flow characteristics at room temperature. In each case the viscosity and tackiness was rapidly increased, by heating, before the formation of the coil, and quick curing enamels were necessarily selected for this purpose.

I have invented a new and useful method and article of which the foregoing description is exemplary rather than definitive and for which I desire an award of Letters Patent as defined in the following claims.

I claim:

1. The method of forming an electrical coil comprising the steps of:
(A) continuously directly covering the metal surface of a metallic strip with a coating of liquid thermosetting insulating resin,
(B) without solidifying said coating, winding said strip to form a spiral coil with said coating completely wetting two adjacent turns of said coil, during said winding applying tension to said strip sufficient to exude said resin over the edges of said coil, thereby insulating said edges, said tension being insufficient to break through said resin between turns,
(C) curing said coating thereby permanently bonding said coil.

2. The method of claim 1 wherein said coating is applied to said strip by means of a roller.

3. The method of claim 2 comprising the step of heating said resin prior to applying said resin by means of said roller, said resin being too viscous for roller application absent said heating.

4. The method of claim 1 wherein said resin comprises an epoxy.

5. The method of claim 4 wherein said resin comprises approximately 50 parts of a condensation product of bisphenol-A and epichlorohydrin having a melting point of 127–133° C., a weight per epoxide of 1600–2000, and a viscosity at 77° F. of a 40% solution in butyl carbitol of 1500–3000 centipoises; 40 parts of a condensation product of bisphenol-A and epichlorohydrin having a viscosity of 10,000–16,000 centipoises at room temperature, a sp. gr. at 25° C. of 1.15–1.17 and a weight per epoxide of 1800–2000; and approximately 4.5 parts dicyandiamide.

6. The method of claim 5 wherein said resin is heated to approximately 93° C. at application and said coil is cured at approximately 170° C.

7. The method of forming an electrical coil comprising the steps of:
(A) forming a solid resinous coating of insulation on one surface of a metallic strip,
(B) continuously directly coating the other uncoated metal surface of said strip with a liquid insulating resin,
(C) without solidifying said resin spirally winding said strip into a coil, said resin completely wetting two adjacent turns of said coil, during said winding applying tension to said strip sufficient to exude said resin over the edges of said coil, thereby insulating said edges, said tension being insufficient to break through said resin between turns,
(D) curing said resin thereby permanently bonding said coil.

8. The method of claim 7 wherein said resin is applied to said strip by means of a roller.

9. The method of claim 8 wherein said resin comprises a blend of an epoxy and the condensation product of a polyamine and a dibasic acid.

References Cited

UNITED STATES PATENTS

| | | | |
|---|---|---|---|
| 3,128,798 | 4/1964 | Liebman | 29—605 X |
| 3,270,401 | 9/1966 | Staley et al. | 29—605 |
| 3,292,243 | 12/1966 | Hofling | 29—605 |
| 3,359,630 | 12/1967 | Metz | 29—605 |
| 3,412,354 | 11/1968 | Sattler | 29—605 X |
| 3,418,710 | 12/1968 | Seidel et al. | 29—605 X |

JOHN F. CAMPBELL, Primary Examiner

C. E. HALL, Assistant Examiner

U.S. Cl. X.R.

29—25.42; 336—205, 206

PO-1050
(5/69)

UNITED STATES PATENT OFFICE
CERTIFICATE OF CORRECTION

Patent No. 3,518,755 Dated July 7, 1970

Inventor(s) EMIL H. OLSON

It is certified that error appears in the above-identified patent and that said Letters Patent are hereby corrected as shown below:

Col. 2, line 5, for "180-200" read --1800-2000--

Col. 4, line 64, correct the spelling of --squeezed--
after "out" insert --by--

Col. 5, line 5, for "our" read --my--

Col. 6, line 28, for "claim 8" read --claim 7--

SIGNED AND
SEALED
NOV 3 1970

(SEAL)
Attest:

Edward M. Fletcher, Jr.
Attesting Officer

WILLIAM E. SCHUYLER, JR.
Commissioner of Patents